Feb. 9, 1937.  J. H. L. DE BATS  2,070,156
TOOL AND METHOD OF MAKING SAME
Filed July 25, 1934
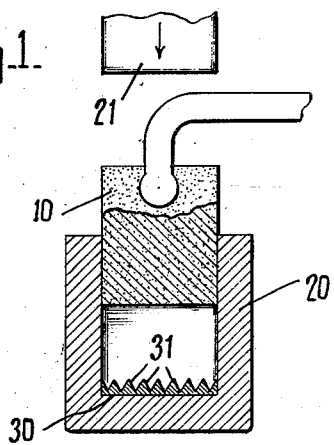
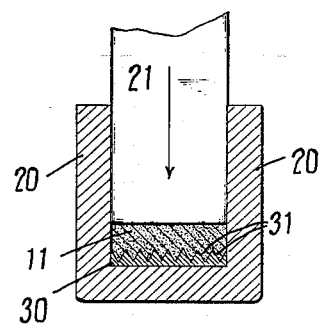
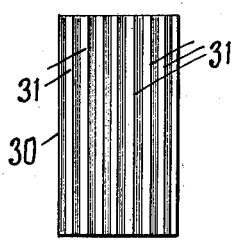
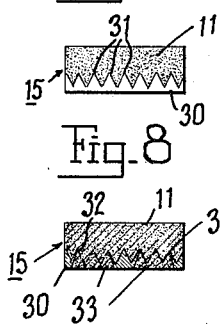
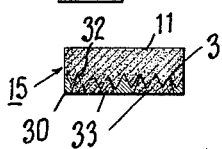
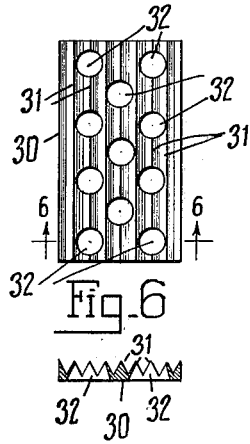
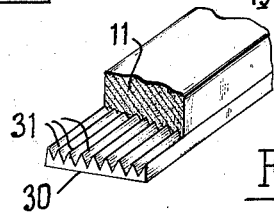
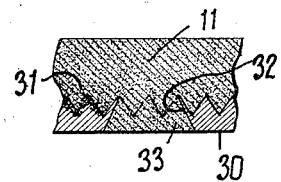
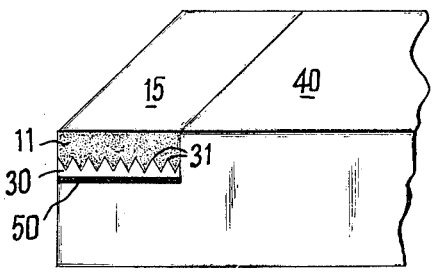
INVENTOR
Jean Hubert Louis De Bats
BY
Austin A. Dix
ATTORNEYS Patented Feb. 9, 1937

2,070,156

UNITED STATES PATENT OFFICE 2,070,156

TOOL AND METHOD OF MAKING SAME

Jean Hubert Louis De Bats, East Orange, N. J., assignor of ten per cent to Howard W. Dix, Scarsdale, N. Y., and of ninety per cent to Metal Carbides Corporation, Youngstown, Ohio, a corporation of New Jersey Application July 25, 1934, Serial No. 736,848

4 Claims. (Cl. 76—101)

This invention relates to improvements in cutting tools having refractory metal tips, and more particularly to a tip or nib manufactured from material of high cutting capacity, such as alloys of carbides, borides, nitrides or silicides of metals of the sixth periodic group, and provided with a steel surfacing integrally secured thereto or associated therewith, whereby the so-surfaced nib may be directly welded or brazed to a tool shank without requiring auxiliary equipment for securing a joint.

In the preparation of cutting tools having nibs or tips of tungsten carbide, or other like refractory compositions, alloyed with metals such as cobalt, iron or nickel, considerable difficulty has been encountered in adhering the compositions to the tools, due to the fact that the brazing methods recommended do not give practical results. This failure of such brazing processes is due to the fact that a brazed material will not provide a tight, tough joint between materials of divergent composition, for example steel may be brazed to steel with remarkable results, but steel cannot be brazed to tungsten carbide or like materials. Among the expedients attempted to be used to overcome these natural difficulties, it has been suggested to use inserts coated or covered with a soldering or brazing material. Here again, the difficulty remains that it is practically impossible to secure a lasting joint directly between a tungsten carbide base metal composition and a steel member.

A feature of the present invention resides in the provision of steel surfacings for cutting nibs or tips of tungsten carbide compositions, whereby such tips or nibs may be directly brazed or welded to a steel shank, a steel to steel joint being made use of.

A further feature of novelty and advantage of the present invention resides in the provision of a cutting tip or nib of a refractory metal composition drop-forged onto a steel member and welded or integrally secured thereto, whereby the resulting steel surfaced member may be brazed or welded in place on a tool body.

It is also a feature or novelty of the present invention to provide improved shim members having serrated or irregular carbide metal receiving surfaces adapted to be melted by and interfused with highly heated carbide metal masses under the influence of a drop-forging blow. A further feature of novelty includes the provision of sockets or other apertures in the shim members to provide added keying or locking of the carbide metal in place on the shim or facing material.

It is also a feature of novelty of the present invention to provide an improved cutting tool having a refractory metal base tip or nib brazed thereon, the tip or nib being provided with an integral steel surfacing for assuring a proper joining of the tip to the tool body.

These and other desirable features and advantages, will be described in the specification and illustrated in the accompanying drawing, certain preferred features and devices being shown by way of illustration only, for, since the underlying principles and features may be incorporated in other specific structures, it is not intended to be limited to the ones here shown unless such limitations are clearly imposed by the appended claims.

In the drawing, like numerals refer to similar parts throughout the several views, of which—

Fig. 1 is a vertical section of a drop-forging die and associated hammer with a heated refractory metal mass being placed in position to be drop-forged onto a shim member;

Fig. 2 is a view similar to Fig. 1, showing the piston or hammer head at the completion of the drop-forging blow with the refractory metal mass compacted and forged into position on the shim;

Fig. 3 is an elevation;

Fig. 4 is a section of a fluted or serrated shim member;

Figs. 5 and 6 are respectively views similar to Figs. 3 and 4, in which the shim member is provided with locking apertures;

Fig. 7 is an end elevation of a nib with an adhered or autogenously adhered shim member;

Fig. 8 is a view similar to Fig. 7, showing a transverse section through the shim member of Fig. 7, and showing the locking apertures of the shim;

Fig. 9 is a view, partly in elevation, and partly in broken section, of drop-forged nib material, mounted on a shim surfacing;

Fig. 10 is a detailed section of a composite nib and shim showing the locking of the nib material by apertures; and Fig. 11 is an end elevation of a finished composite nib and shim brazed onto an end of a tool shank.

Referring more specifically to the drawing, the invention may be more readily comprehended by reference to the process of preparing the improved products of the present invention. In the practice of the invention a preliminary furnaced refractory carbide metal mass 10 of tungsten carbide, tantalum carbide, or other refractory carbides alloyed or bonded with cobalt, nickel, iron, steel or other materials, is introduced into a die 20 containing a steel shim 30. The refractory carbide mass may comprise compositions containing tungsten carbide in preponderating amount of the order of 99.5% to 50% with the balance .5 to 50% of an auxiliary metal. Suitable auxiliary metals include the metals of the iron group and specifically nickel, iron and cobalt. In addition, other auxiliary metals may be used, including carbon-free alloys of tungsten and cobalt, including 98 to 50% of tungsten and 2 to 50% cobalt. The materials are preferably furnaced and treated at temperatures of the order of 2000° C. and above. The hammer 21 of the drop forge or percussion press in which the die 20 is set up is dropped on the mass 10 with pressures of the order of 1 to 500 tons per square inch and above, compacting it to the reduced densified size and form shown in Fig. 2 and indicated generally by the numeral 11. The white hot material, as a result of the drop-forging blow, is welded or adhered to the ridges 31 of the shim 30, forming a composite nib member. This composite member, for purposes of convenience, may be designated generally by the numeral 15.

As noted hereinabove, not only may the shim 30 be made of tool steel, or any suitable steel composition, and be provided with ridges or serrations 31, but it may also be provided with locking or keying apertures 32, as shown more particularly in Figs. 5, 6 and 8. By providing these apertures, when the heated refractory mass 10 is subjected to a drop-forging blow to compact it, as shown at 11, it is forced into the apertures 32, as indicated generally at 33, being keyed in place and serves to form a mechanical lock for the mass or bulk of nib material 11, in addition to the welding effect produced at the surfaces of the serrations or ridges 31.

The steel surfaced refractory metal nib 15, it will be seen, is thus provided with a steel shim or facing on at least one face thereof. This member 15 may then be brazed or soldered onto a tool shank 40 by means of any suitable braze, indicated generally by the numeral 50. As was pointed out hereinabove, the steel surfacing 30 can be readily brazed or welded to the steel body 40 by means of brazed material 50, as a steel to steel braze, is a remarkably tight and adherent joint. The composite nib members 15 can thus be made up in any desired size and quantity and shape and the tool users can apply them to tool bodies, using ordinary brazing procedure and materials to secure efficient tools, and in which they are assured of efficient results due to the tight adhereing joint between the parts. These results are in marked distinction to the results obtained by attempting to directly braze tungsten carbide base articles on to steel or other ferrous metal bodies.

The composite nibs formed according to the present invention can be made up in a variety of sizes and with coating compositions of varying refractory metal content. The refractory metal compositions may include tungsten carbide in amount from 50 to 90% with a binding or alloying metal comprising the remainder. Of the alloying metals, which may preferably be used, iron, nickel and cobalt, give good results, although better results ore obtainable by the use of an alloy comprising 50 to 90% tungsten metal alloyed with a metal such as cobalt or nickel, the composition being carbon free. The nibs may also be centrifugally cast in place on the shims.

It will now be appreciated that there has been provided a novel article of manufacture, including a refractory metal tip or nib or wearing part, having an adhering steel surfacing directly welded or fused thereto and thereon, the so formed article being adapted to be directly brazed or welded to tool bodies.

The terms and expressions which have been employed herein are used as terms of description and not of limitation, and there is no intention, in the use of such terms and expressions, of excluding any equivalents of the features shown and described, or portions thereof, but it is recognized tht various modifications are possible within the scope of the invention claimed.

What is claimed is:

1. The method of making tools comprising placing a steel shim member having anchoring means on one surface thereof in a forging die, heating a tungsten carbide alloy composition containing 50 to 99% tungsten carbide to a temperature of the order of about 2000° C., inserting the heated carbide mass at said temperature in the die and in engagement with the anchoring means of the shim member, and immediately subjecting said heated mass and shim to a drop forging blow of the order of fifty to two hundred tons and above whereby to densify the carbide mass and alloy the same to the steel surfacing to form a tool nib; and thereafter brazing the steel facing of the so formed steel faced composite tool nib to a tool body.

2. The method of making tools comprising placing a steel shim member having anchoring means such as ridges and apertures on one surface thereof in a forging die, heating a tungsten carbide alloy composition containing 50 to 99% tungsten carbide to a temperature of the order of about 2000° C., inserting the heated carbide mass at said temperature in the die and in engagement with the anchoring means of the shim member, and immediately subjecting said heated mass and shim to a drop forging blow of the order of fifty to two hundred tons and above whereby to densify the carbide mass and alloy the same to the steel surfacing to form a tool nib; and thereafter brazing the steel part of so formed composite steel faced tool nib to a tool body.

3. A cutting tool comprising a composite nib consisting of a tungsten carbide composition and a steel shim facing anchored thereto in alloying relation, a body portion for the tool, and a brazing material uniting said steel shim facing and said body portion.

4. A cutting tool comprising a composite nib consisting of a tungsten carbide composition and a steel shim surfacing member having ridges on one side thereof anchored thereto in alloying relation, a body portion for the tool, and a brazing material uniting the said steel shim surfacing member and said body portion.

JEAN HUBERT LOUIS DE BATS.